United States Patent Office 3,492,238
Patented Jan. 27, 1970

---

3,492,238
SODIUM PHOSPHATE-CITRIC ACID-EDTA CLEANING SOLUTIONS FOR SCALED FERROUS METALS
Cornel Wohlberg, Hempfield Township, Westmoreland County, Pa., assignor to the United States of America as represented by the United States Atomic Energy Commission
No Drawing. Filed Dec. 5, 1966, Ser. No. 599,675
Int. Cl. C02b 5/00; C23g 1/00; C09k 3/00
U.S. Cl. 252—87                                   1 Claim

---

ABSTRACT OF THE DISCLOSURE

A buffered mixture of sodium phosphate-citric-amino acids of the EDTA type is used to remove scale or deposited oxides from ferrous metals with a minimum of attack on the metal itself.

---

The invention described herein was made in the course of, or under, Contract W-7405-ENG-36 with the U.S. Atomic Energy Commission.

There is a need for an effective hot or cold cleaning agent for ferrous oxides and magnetite scale or deposit with a minimum of attack on the ferrous metals of the nonstainless types. Some of the characteristics of such a cleaning solution should be (1) a good complexer in that at relatively high pH (approximately 7.0) no precipitate is formed, (2) able to dissolve oxide scale off an alloy steel pipe (5% Cr—1% Mo), and (3) that little hydrogen is evolved. It is important therefore that the solution dissolves oxides rather than metals, and furthermore it is important to minimize the hydrogen evolved in order to avoid possibilities of hydrogen embrittlement. To this inventor's knowledge, none of the above characteristics are combined in any presently known cleaning solution although there are many scaling or cleaning solutions for ferrous metals that have some of the above characteristics.

With the above characteristics in mind, the inventor has discovered that the following materials were suitable for formulating a cleaning solution for scaled ferrous metals: (1) citric acid, (2) phosphates, and (3) an EDTA type (ethylene diamine tetracetic acid). The citric acid acts as an excellent chelating agent over a wide pH range although its solvent ability diminishes with increasing pH while the phosphates as a group make excellent buffer systems. The EDTA is a second type of chelator and has a synergistic affect on the chelating and solvent effect of the citric acid.

It is therefore an object of this invention to provide a composition that is effective as a cold or hot cleaning agent for various ferrous oxides and magnetite scale or deposit with a minimum of attack on the metal itself.

Other objects of this invention will become apparent from the following description of the composition of the preferred embodiment.

10 g. of citric acid
10 g. $Na_3PO_4 \cdot 12 H_2O$
10 g. Versene Fe-3 sodium dihydroxyethylglycyine flake with a structural formula as follows:

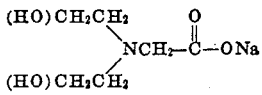

125 ml. water.

The pH is maintained between 6.0 and 7.0.

Mixtures of citric acid and sodium phosphate in the same pH range are not noticeably effective on scaled steel; however, other compounds such as the polyphosphates, gluconic acid, and EDTA may be used in various proportions as stated in the above formulation. In particular, the scaling solution is composed of a mixture of hydroxyacid, phosphate, and amino acid salt with said solution being maintained at a high pH (6.0–7.0) so as to minimize hydrogen evolution and possible embrittlement of the alloy being cleaned.

The above scaling solution is a very effective cold or hot cleaning agent for ferrous oxides and magnetite scale, and in addition, there is a minimum of attack on the ferrous metal. Further characteristics of this cleaning solution are that little hydrogen is evolved, thus avoiding hydrogen embrittlement of the metal, and no precipitate is formed. Thus, only the oxide of the metal and not the metal itself is attacked by the solution.

What is claimed is:
1. A cleaning solution for scaled ferrous metals and consisting of the following formula in equal parts by weight: citric acid; $Na_3PO_4 \cdot 12 H_2O$; sodium dihydroxyethylglycine flake with a structural formula as follows:

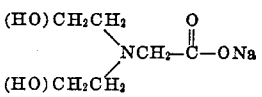

with sufficient water to maintain the pH between 6.0 and 7.0.

References Cited

UNITED STATES PATENTS

| | | | |
|---|---|---|---|
| 2,396,938 | 3/1946 | Bersworth | 252—142 |
| 2,783,200 | 2/1957 | Crum et al. | 252—82 |
| 2,890,175 | 1/1959 | Kipps | 252—87 |
| 2,994,664 | 8/1961 | Wachter | 252—87 |
| 3,003,898 | 10/1961 | Reich | 252—82 |
| 3,003,899 | 10/1961 | Eberhard et al. | 252—142 |
| 3,013,909 | 12/1961 | Pancer et al. | 134—3 |
| 3,063,944 | 11/1962 | Zussman et al. | 252—142 |
| 3,242,093 | 3/1966 | Compton | 252—142 |
| 3,397,149 | 8/1968 | Gruber | 252—82 |

MAYER WEINBLATT, Primary Examiner
I. GLUCK, Assistant Examiner

U.S. Cl. X.R.
134—3, 41; 252—87, 148, 181